United States Patent
Liu et al.

(10) Patent No.: US 12,407,431 B2
(45) Date of Patent: Sep. 2, 2025

(54) LOCATION PREDICTION METHOD AND APPARATUS, NODE AND STORAGE MEDIUM

(71) Applicant: ZTE Corporation, Guangdong (CN)

(72) Inventors: Zhuang Liu, Guangdong (CN); Yin Gao, Guangdong (CN); Jiajun Chen, Guangdong (CN)

(73) Assignee: ZTE Corporation, Shenzhen (CN)

( * ) Notice: Subject to any disclaimer, the term of this patent is extended or adjusted under 35 U.S.C. 154(b) by 323 days.

(21) Appl. No.: 17/799,574

(22) PCT Filed: Aug. 9, 2021

(86) PCT No.: PCT/CN2021/111559
§ 371 (c)(1),
(2) Date: Aug. 12, 2022

(87) PCT Pub. No.: WO2022/033436
PCT Pub. Date: Feb. 17, 2022

(65) Prior Publication Data
US 2023/0179309 A1  Jun. 8, 2023

(30) Foreign Application Priority Data
Aug. 10, 2020  (CN) .......................... 202010796772.6

(51) Int. Cl.
*H04W 24/00* (2009.01)
*G01S 5/00* (2006.01)
(Continued)

(52) U.S. Cl.
CPC ............ *H04B 17/27* (2015.01); *G01S 5/0036* (2013.01); *H04B 17/26* (2015.01); *H04W 24/02* (2013.01)

(58) Field of Classification Search
CPC ......... H04W 36/008375; H04W 64/00; H04W 36/00; H04W 24/10; H04W 24/02;
(Continued)

(56) References Cited

U.S. PATENT DOCUMENTS 8,706,131 B2 * 4/2014 Winters ................ G01S 5/0294
455/452.2
9,123,014 B1 * 9/2015 Erdmann ........... G01C 21/3617
(Continued)

FOREIGN PATENT DOCUMENTS

CN    105992252 A    10/2016
CN    107809767 A    3/2018
(Continued)

OTHER PUBLICATIONS

Japanese office action issued in JP Patent Application No. 2022-548157, dated Feb. 6, 2024, 3 pages. English translation included.
(Continued)

*Primary Examiner* — Marceau Milord
(74) *Attorney, Agent, or Firm* — Perkins Coie LLP (57) ABSTRACT

Provided are a location prediction method and apparatus, a node and a storage medium. The method includes: a server obtaining a measurement report message sent by a base station, where the measurement report message includes historical location measurement information reported by at least one UE and/or historical location measurement information of the at least one UE measured by the base station; and the server determining prediction location information of the at least one UE at a first time point or in a first time period according to the measurement report message, and sending notification information to the base station according to the prediction location information. By introducing
(Continued)

measurement information in multiple dimensions, the accuracy of predicting the location of UE can be effectively improved.

17 Claims, 2 Drawing Sheets

(51) Int. Cl.
  *H04B 17/26* (2015.01)
  *H04B 17/27* (2015.01)
  *H04W 24/02* (2009.01)
(58) Field of Classification Search
  CPC . G01S 1/00; G01S 5/0036; G01S 5/00; H04B 17/27; H04B 17/26
  USPC .................................. 455/456.1, 436, 442
  See application file for complete search history.

(56) References Cited

U.S. PATENT DOCUMENTS

| | | | | |
|---|---|---|---|---|
| 9,380,487 | B2* | 6/2016 | Shafiee | H04W 28/0226 |
| 9,992,627 | B2* | 6/2018 | Letz | G08G 1/0129 |
| 10,171,614 | B2* | 1/2019 | Duan | H04L 67/1001 |
| 10,184,798 | B2* | 1/2019 | Sidhu | G01C 21/188 |
| 10,223,744 | B2* | 3/2019 | Brady | G06Q 40/02 |
| 10,524,225 | B1* | 12/2019 | Boross | G01S 5/0295 |
| 10,743,141 | B2* | 8/2020 | Fairbanks | H04W 4/80 |
| 10,932,221 | B2 | 2/2021 | Grossmann et al. | |
| 11,070,949 | B2* | 7/2021 | Gross | H04W 4/029 |
| 11,356,349 | B2* | 6/2022 | Cui | H04M 15/49 |
| 2010/0323715 | A1* | 12/2010 | Winters | H04W 36/008375 340/988 |
| 2011/0244859 | A1* | 10/2011 | Tsuda | H04W 36/245 455/436 |
| 2012/0083263 | A1 | 4/2012 | Kim et al. | |
| 2013/0110454 | A1* | 5/2013 | Sidhu | G01C 21/188 702/150 |
| 2014/0099970 | A1* | 4/2014 | Siomina | H04W 64/00 455/456.1 |
| 2016/0037379 | A1* | 2/2016 | Shafiee | H04W 28/0268 370/230.1 |
| 2016/0225072 | A1* | 8/2016 | Brady | G07C 5/008 |
| 2016/0234648 | A1* | 8/2016 | Letz | G08G 1/0141 |
| 2017/0208540 | A1* | 7/2017 | Egner | H04W 64/003 |
| 2017/0374515 | A1* | 12/2017 | Cox | G08B 21/0227 |
| 2018/0035336 | A1 | 2/2018 | Wang et al. | |
| 2018/0227386 | A1* | 8/2018 | Duan | G07C 5/008 |
| 2019/0253861 | A1* | 8/2019 | Horelik | H04W 64/006 |
| 2019/0373415 | A1* | 12/2019 | Fairbanks | H04W 4/40 |
| 2020/0196110 | A1* | 6/2020 | Jakobsson | H04W 76/14 |
| 2020/0285977 | A1* | 9/2020 | Brebner | G06N 5/022 |
| 2020/0293796 | A1* | 9/2020 | Sajjadi Mohammadabadi | B60W 30/095 |
| 2020/0302645 | A1* | 9/2020 | Parchami | G05D 1/0088 |
| 2020/0304955 | A1* | 9/2020 | Gross | G06F 3/0488 |
| 2021/0211946 | A1* | 7/2021 | Li | H04W 36/00835 |
| 2021/0223059 | A1* | 7/2021 | Brush | G01C 21/3673 |
| 2021/0295171 | A1* | 9/2021 | Kamenev | G06N 3/088 |
| 2022/0021597 | A1* | 1/2022 | Cui | H04W 4/24 |
| 2023/0354060 | A1* | 11/2023 | Chen | H04W 76/20 |

FOREIGN PATENT DOCUMENTS

| | | |
|---|---|---|
| CN | 111901827 A | 11/2020 |
| CN | 111935740 A | 11/2020 |
| CN | 111935765 A | 11/2020 |
| EP | 1460874 A2 | 9/2004 |
| JP | 2001-128217 A | 5/2001 |
| JP | 2001-128222 A | 5/2001 |
| JP | 2010-246014 A | 10/2010 |
| JP | 2019-531483 A | 10/2019 |
| WO | 2020146711 A1 | 7/2020 |

OTHER PUBLICATIONS

European Search Report issued in EP Patent Application No. 21855488.9, dated Jul. 7, 2023, 11 pages.
Japanese office action issued in JP Patent Application No. 2022-548157, dated Sep. 19, 2023, 8 pages. English translation included.
Zte et al., "Solution to AI based UE Trajectory Prediction," 3GPP TSG RAN WG3 #112-e, Online, R3-212029, 9 pages, May 17-28, 2021.
International Search Report and Written Opinion for International Application No. PCT/CN2021/111559, mailed on Oct. 26, 2021 (10 pages).

* cited by examiner

LOCATION PREDICTION METHOD AND APPARATUS, NODE AND STORAGE MEDIUM

This application is a U.S. National Stage Application of PCT Application Ser. No. PCT/CN2021/111559, filed Aug. 9, 2021, which claims priority to Chinese patent application No. 202010796772.6 filed Aug. 10, 2020, the disclosures of which are incorporated herein by reference in their entireties.

FIELD

The present application relates to the field of wireless communication technology, in particular, to a location prediction method and apparatus, a node and a storage medium.

BACKGROUND

In the existing radio access network (RAN), only the positioning of current terminal location is supported, and the possible location of the terminal at a next time point cannot be predicted according to the relevant historical training data. In the current wireless network design, the prediction of a location of artificial intelligence (AI)-based terminal at a next time point cannot be supported, and there exists a relatively large prediction deviation when the prediction of the location is performed only through the historical locations of the terminal.

SUMMARY

Embodiments of the present disclosure provide a location prediction method and apparatus, a node and a storage medium, aiming to effectively improve accuracy of predicting location of an user equipment (UE).

Provided is a location prediction method, including the following:

A server obtains a measurement report message sent by a base station; where, the measurement report message includes historical location measurement information reported by at least one user equipment UE and/or historical location measurement information of the at least one UE measured by the base station.

The server determines prediction location information of the at least one UE at a first time point or a first time period, according to the measurement report message.

The server sends notification information to the base station. according to the prediction location information.

Provided is a location prediction method, including the following:

A base station sends a measurement report message to a server, the measurement report message includes the historical location measurement information reported by the at least one UE and/or the historical location measurement information of the at least one UE measured by the base station.

The base station obtains notification information sent by the server according to the measurement report message.

The base station performs an optimization operation according to the notification information.

Provided is a location prediction apparatus, including an obtaining module, a determining module, and a sending module.

The obtaining module is configured to obtain a measurement report message sent by a base station; where, the measurement report message includes historical location measurement information reported by at least one UE and/or historical location measurement information of the at least one UE measured by the base station.

The determining module is configured to determine prediction location information of the at least one UE at a first time point or a first time period according to the measurement report message.

The sending module is configured to send notification information to the base station according to the prediction location information.

Provided is a location prediction apparatus, including a sensing module, an obtaining module, and an executing module.

The sending module is configured to send a measurement report message to a server, and the measurement report message includes historical location measurement information reported by at least one UE and/or historical location measurement information of the at least one UE measured by the base station.

The obtaining module is configured to obtain notification information sent by the server according to the measurement report message.

The executing module is configured to perform an optimization operation according to the notification information.

Provided is a node, including: a memory, a processor, a program stored on the memory and executable on the processor, and a data bus for implementing connection and communication between the processor and the memory, and the program, when executed by the processor, performs the location prediction method according to the location prediction method provided by the present application.

Provided is a readable and writable storage medium for computer storage, where the storage medium stores one or more programs, and the one or more programs is executable by one or more processors to perform the location prediction method provided by the present application.

Embodiments of the present application provide a location prediction method and apparatus, a node and a storage medium. The method includes: a server obtaining a measurement report message sent by a base station, where the measurement report message includes historical location measurement information reported by at least one UE and/or historical location measurement information of the at least one UE measured by the base station; and the server determining prediction location information of the at least one UE at a first time point or in a first time period according to the measurement report message, and sending notification information to the base station according to the prediction location information. By introducing measurement information in a plurality of dimensions, the accuracy of predicting the location of UE can be effectively improved.

DETAILED DESCRIPTION OF EMBODIMENTS

In order to make the objectives, technical solutions and advantages of the present application clearer, the embodiments of the present application will be described in detail below with reference to drawings. It should be noted that, the embodiments in the present application and the features in the embodiments may be arbitrarily combined with each other if there is no conflict.

In addition, in the embodiments of the present application, words such as "optionally" or "exemplarily" are used to represent examples, illustrations, or illustrations. Any embodiments or designs described in the embodiments of the present application as "optionally" or "exemplarily" should not be explained to be preferred or advantageous over other embodiments or designs. Rather, use of words such as "optionally" or "exemplarily" is intended to present related concepts in a specific manner.

Figure 1:
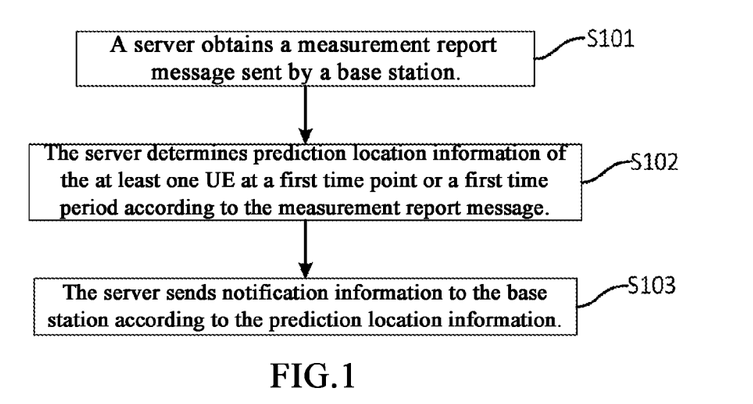
FIG. 1 is a flowchart of a location prediction method according to an embodiment of the present disclosure.

FIG. 1 is a flowchart of a location prediction method according to embodiments of the present application. The method can be applied to an AI server. As shown in FIG. 1, the method may include the following:

S101, a server obtains a measurement report message sent by a base station.

In an embodiment, the server may be an AI server, which may be a separate network element, or may be a network element disposed located within the base station. The measurement report message obtained by the server may comprise historical location measurement information reported by at least one user equipment (UE) and/or historical location measurement information of the at least one UE measured by the base station.

S102, the server determines prediction location information of the at least one UE at a first time point or a first time period according to the measurement report message.

The first time point or first time period can be understood as a certain time point or time period in the future, that is, after the server obtains the historical location measurement information reported by at least one UE and/or the historical location measurement information of the at least one UE measured by the base station, the prediction location information of the at least one UE at a certain time point or multiple time points (i.e., a certain time period) in the future can be determined based on the obtained historical location measurement information.

The prediction location information may include one or more of the following: a predicted latitude and longitude coordinate, a predicted identification of a cell where the UE is located, predicted altitude information, predicted connection beam identification information with a certain cell, and predicted information of a tracking area (TA) where the UE is located.

S103, the server sends notification information to the base station according to the prediction location information.

The notification information in this embodiment may carry prediction location information indicating one UE, or may be optimization operation information generated by the server according to the prediction location information. In this way, the base station can perform the optimization operation according to the optimization operation information sent by the server, or determine and execute the relevant optimization operation according to the prediction location information sent by the server.

Embodiments of the present application provide a location prediction method. The server obtains a measurement report message sent by a base station; where, the measurement report message includes historical location measurement information reported by at least one UE and/or historical location measurement information of the at least one UE measured by the base station; the server determines prediction location information of the at least one UE at a first time point or a first time period according to the measurement report message; the server sends notification information to the base station according to the prediction location information. By introducing measurement information of multiple dimensions, the accuracy of predicting the location of the UE can be effectively improved.

In one example, the historical location measurement information reported by the at least one UE included in the measurement report message includes speed information and/or Angle-of-Departure (AOD) measurement information, and the historical location measurement information of the at least one UE measured by the base station included in the measurement report message includes Angle of Arrival (AOA) measurement information. By introducing information such as the speed information and the AOD measurement information, the accuracy of predicting the location of the UE can be effectively improved. Further, on the basis of the UE measurement speed information and the AOD measurement information, combined with the AOA measurement information of the UE measured by the base station, the accuracy of predicting the location of the UE can be effectively improved.

Exemplarily, the historical location measurement information reported by the at least one UE further includes at least one of the following: a UE identity, at least one historical time point, and location information of the at least one historical time point (for example, latitude and longitude coordinates). The UE identity corresponds to the at least one historical time point, the location information, the speed information and/or the AOD measurement information. The historical location measurement information of the at least one UE measured by the base station further includes at least one of the following: a UE identity, and at least one historical time point, and the UE identity corresponds to the at least one historical time point and the AOA measurement information.

In one example, in a case where the server is a separate network element, the implementation manner of the above S101 may be that the server obtains the measurement report message sent by the base station through an interface between the server and the base station.

In a case where the server is a network element located within the base station, the implementation manner of the above S101 may be that the server obtains the measurement report message sent by the base station through the interface located within the base station.

Correspondingly, in a case where the server is a separate network element, the implementation manner of the above S103 may be that the server sends the notification information to the base station through the interface between the server and the base station.

In a case where the server is a network element located within the base station, the implementation manner of the above S103 may be the server sends the notification information to a control plane of the base station through the interface located within the base station.

In one example, when the server determines prediction location information of the at least one UE at the first time point or the first time period, a machine learning (ML)

algorithm may be selected to perform model training and model prediction according to the relevant data information in the measurement report message, so as to predict the location of the at least one UE at one or more time points in the future.

Further, the server may generate the optimization operation information based on the determined prediction location information, and send the notification information carrying the optimization operation information to the base station in a manner of a RAN operating a request message, so that the base station performs the optimization operation according to the optimization operation information. Alternatively, the server may directly carry the prediction location information in the notification information and send the prediction location information to the base station, and the base station determines and performs a corresponding optimization operation according to the prediction location information.

The optimization operation information generated by the above server includes at least one operation indication and a parameter corresponding to at least one operation.

Figure 2:
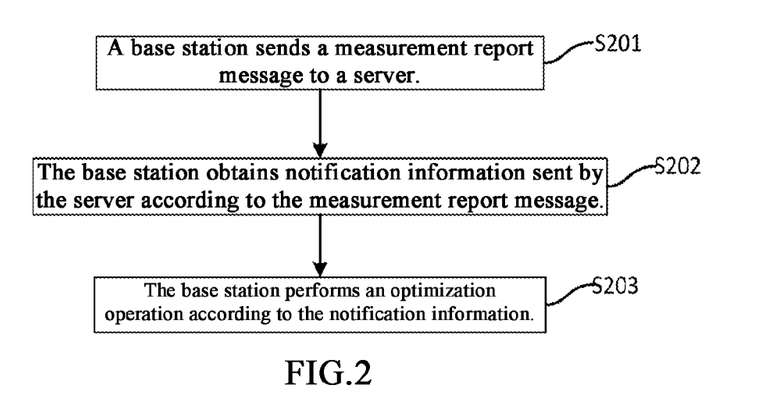
FIG. 2 is a flowchart of a location prediction method according to an embodiment of the present disclosure.

FIG. 2 is a flowchart of a location prediction method according to embodiments of the present application. The method may be applied to the base station. As shown in FIG. 2, the method may include the following:

S201, a base station sends a measurement report message to a server.

Exemplarily, the measurement report message includes the historical location measurement information reported by the at least one UE and/or the historical location measurement information of the at least one UE measured by the base station.

The above-mentioned server may be an AI server, which may be a separate network element, or may be a network element disposed located within the base station.

S202, the base station obtains notification information sent by the server according to the measurement report message.

In an embodiment the above notification information may carry the prediction location information, or the optimization operation information. The prediction location information is the prediction location information of the at least one UE at a first time point or a first time period determined according to the measurement report message after the server receives the measurement report message sent by the base station. For example, the prediction location information may include one or more of the following: a predicted latitude and longitude coordinate, a predicted identification of a cell where the UE is located, predicted altitude information, predicted connection beam identification information with a certain cell, and predicted information of a tracking area (TA) where the UE is located.

The optimization operation information may be generated by the server according to the prediction location information, and the optimization operation information may include at least one operation indication and a parameter corresponding to at least one operation.

The above-mentioned first time point or first time period can be understood as a certain time point in the future or a certain time period in the future, that is, the server determines the prediction location information of the at least one UE at a certain time point or multiple time points (i.e., a certain time period) in the future S203, the base station performs an optimization operation according to the notification information.

In an embodiment, in a case where the notification information carries the optimization operation information, the base station can directly perform the optimization operation according to the notification information. In a case where the notification information carries the prediction location information, the base station determines and performs the corresponding optimization operation by the base station itself according to the prediction location information.

Exemplarily, the above-mentioned optimization operation indication may include a UE handover indication, a cell closing/opening indication, a radio resource activation/deactivation indication, a power adjustment indication, a radio resource management (RRM) parameter reconfiguration indication, and an offload operation indication, a protocol layer parameter reconfiguration instructions, etc.

Further, in the process of the base station performing the optimization operation, if the optimization operation involves at least one UE (for example, according to the prediction location information, the corresponding UE is switched to the other target base stations), the base station may send a radio resource control (RRC) reconfiguration message or a RRC release message to the UE connected to the base station, and informs the UE to perform the related operation.

In one example, the historical location measurement information reported by the at least one UE includes speed information and/or Angle-of-Departure (AOD) measurement information, and the historical location measurement information of the at least one UE measured by the base station includes Angle of Arrival (AOA) measurement information.

In one example, in a case where the server is a separate network element, the implementation manner of S201 may be that the base station sends the measurement report message through the interface between the base station and the server. Alternatively, in a case where the server is a network element located within the base station, the implementation manner of S201 may be may be that the base station sends the measurement report message to the server through the interface located within the base station.

Correspondingly, in a case where the server is a separate network element, the implementation manner of S202 may be that the base station obtains the notification information through the interface between the base station and the server. Alternatively, in a case where the server is a network element located within the base station, the implementation manner of S202 may be that the base station obtains the notification information through the interface located within the base station.

Figure 3:
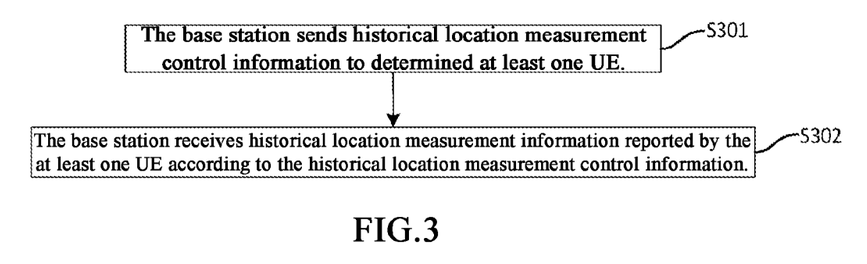
FIG. 3 is a flowchart of a location prediction method according to an embodiment of the present disclosure.

As shown in FIG. 3, in one example, before performing the above-mentioned S201, embodiments of the present application further provide an implementation manner including but not limited to the following:

S301, the base station sends historical location measurement control information to the determined at least one UE.

Exemplarily, the manner in which the base station determines the at least one UE may include: the base station receives an activation message sent by a core network, and the activation message carries first indication information used to indicate policy information, where, the policy information includes at least one type of object identification information, such as, at least one UE identity, at least one cell identity, at least one public land mobile network PLMN identity, at least one non-public network identity, at least one base station identity, and at least one Tracking Area (TA) identity. The UE identity is used to indicate which UEs are performed with location prediction, and the TAC identity is used to indicate in which areas the location of the UE is performed with prediction and tracking.

The base station determines at least one UE according to the at least one type of object identification information. For example, the base station determines at least one UE according to the UE identity, the cell identity, and the like. Further, the base station sends the historical location measurement control information to the determined at least one UE.

S302, the base station receives historical location measurement information reported by the at least one UE according to the historical location measurement control information.

The implementation process of the above S301 and S302 will be described in further detail below with specific examples. For example, in a case where a server is a separate network element, a core network can send an activation message (ML) to the server through an interface between the core network and the server, and the activation message may carry first indication information. Further, the activation message may carry second indication information and third indication information, the second indication information can be used to indicate whether a function of predicting the location of the UE is activated, and the third indication information can be used to indicate a function of activating the server to use machine learning (M).

In an embodiment, the above-mentioned policy information may further include communication quality index information used to indicate a communication quality that an object corresponding to an object identity needs to achieve.

After receiving the activation message, the server may send an ML session setup request message to the base station, where the session setup request message is used to configure measurement data on a base station side required by a certain ML session. In an embodiment, the message may further include an ML session identity, location prediction measurement control information (e.g., speed information of a UE, uplink AOA measurement information, and downlink AOD measurement information), and policy information.

In an embodiment, the base station may also receive a message sent by the core network, such as an UE initial context setup request message, or a handover request message, or a trace start. In an embodiment, the message sent by the core network may carry at least one of the following: whether the UE supports, and an indication of starting a minimization of drive-tests (MDT) location prediction measurement. In this way, the base station can determine at least one UE that needs location prediction by combining policy information and the message sent by the core network.

Further, the base station may configure historical location measurement control information for the determined at least one UE, according to the policy information and the location prediction measurement control information in the ML session setup request message sent by the server. For example, the base station configures whether the UE measures the speed information and/or the AOD measurement information, and sends the historical location measurement control information to the at least one UE connected to this base station in the form of an RRC setup message or reconfiguration message.

In an embodiment, the base station may also configure whether the base station itself needs to measure the historical location measurement information (e.g., AOA measurement information) of the determined at least one UE.

If the measurement configuration on both the base station side and the UE side is successful, the base station may send the ML session setup response message to the server, and the message may carry a configuration success indication. If the measurement configuration at the base station side or the UE side fails, the ML session setup response message carries a configuration failure indication. In an embodiment, the ML session setup response message sent by the base station to the server may also carry a ML session identity.

In a case where the measurement configuration on both the base station side and the UE side is successfully, the base station and the at least one UE may measure related information according to the configuration. For example, the base station may measure the AOA measurement information of the at least one UE, and the at least one UE may measure the speed information, and/or the AOD measurement information.

In an embodiment, the historical location measurement information measured by the at least one UE according to the historical location measurement control information may be carried in a MDT measurement configuration information cell of the RRC setup message or the reconfiguration message and sent to the base station, and the historical location measurement information reported by the at least one UE is sent by the base station to the server in the form of the measurement report message. Similarly, the historical location measurement information of the at least one UE measured by the base station itself may also be sent to the server in the form of the measurement report message. In an embodiment, when sending the measurement report message to the server, the base station may carry the ML session identity.

It can be understood that in a case where the server is a network element located within the base station, the core network can directly send an activation message to the base station. Accordingly, an ML session message do not need to be established between the server and the base station, but the interaction of relevant information is directly performed between the server and the base station through the interface located within the base station.

Figure 4:
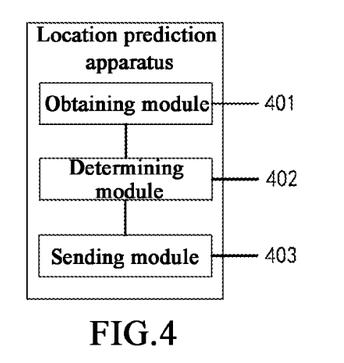
FIG. 4 is a structural diagram of a location prediction apparatus according to an embodiment of the present disclosure.

FIG. 4 is a structural diagram of a location prediction apparatus according to embodiments of the present application. As shown in FIG. 4, the apparatus may include: an obtaining module 401, a determining module 402, and a sending module 403.

The obtaining module is configured for obtaining a measurement report message sent by the base station.

The measurement report message includes the historical location measurement information reported by the at least one UE and/or the historical location measurement information of the at least one UE measured by the base station.

The determining module is configured for determining the prediction location information of the at least one UE at a first time point or a first time period according to the measurement report message.

The sending module is configured for sending notification information to the base station according to the prediction location information.

Exemplarily, the historical location measurement information reported by the at least one UE includes speed information, and/or Angle-of-Departure AOD measurement information, and the historical location measurement information of the at least one UE measured by the base station includes Angle of Arrival AOA measurement information.

In one example, in a case where the server is a separate network element, the obtaining module may obtain the measurement report message sent by the base station through the interface between the base station and the server.

Alternatively, in a case where the server is a network element located within the base station, the obtaining module may obtain the measurement report message sent by the base station through the interface located within the base station.

In one example, the historical location measurement information reported by the at least one UE further includes at least one of the following: an UE identity, at least one historical time point, and location information of the at least one historical time point. The UE identity corresponds to the at least one historical time point, the location information, the speed information and/or the AOD measurement information.

The historical location measurement information of the at least one UE measured by the base station further includes at least one of the following: an UE identity, at least one historical time point, and the UE identity corresponds to the at least one historical time point and the AOA measurement information.

In an embodiment, the notification information may carry the prediction location information, or the optimization operation information.

In one example, the above apparatus further includes a generating module for generating the optimization operation information according to the prediction location information, and the optimization operation information includes at least one operation indication and a parameter corresponding to at least one operation.

In one example, in a case where the server is a separate network element, the sending module may send the notification information to the base station through the interface between the sending module and the base station. Alternatively, in a case where the server is a network element located within the base station, the sending module may send the notification information to the control plane of the base station through the interface located within the base station.

The location prediction apparatus provided in this embodiment is used to implement the location prediction method shown in FIG. 1, and the implementation principle and technical effect are similar, and details are not repeated here.

Figure 5:
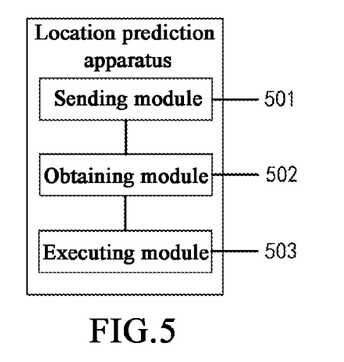
FIG. 5 is a structural diagram of a location prediction apparatus according to an embodiment of the present disclosure.

FIG. 5 is a structural diagram of a location prediction apparatus according to embodiments of the present application. As shown in FIG. 5, the apparatus includes: a sending module 501, an obtaining module 502, and an executing module 503.

The sending module is configured for sending a measurement report message to a server, the measurement report message includes: the historical location measurement information reported by at least one UE and/or historical location measurement information of the at least one UE measured by the base station.

The obtaining module is configured for obtaining notification information sent by the server according to the measurement report message.

The executing module is configured for performing an optimization operation according to the notification information.

In an embodiment, the historical location measurement information reported by the at least one UE may include the speed information, and/or the Angle-of-Departure AOD measurement information, and the historical location measurement information of the at least one UE measured by the base station may include the Angle of Arrival AOA measurement information.

In one example, in a case where the server is a separate network element, the sending module may send the measurement report message through the interface between the sending module and the server. Alternatively, in a case where the server is a network element located within the base station, the sending module may send the measurement report message to the server through the interface located within the base station.

In one example, the above apparatus may further include a receiving module.

The sending module is further configured to send the historical location measurement control information to the determined at least one UE.

The receiving module may be configured to receive the historical location measurement information reported by the at least one UE according to the historical location measurement control information.

In one example, the above apparatus may further include a determining module.

The receiving module is configured to receive an activation message sent by the core network. The activation message carries first indication information, and the first indication information is used to indicate policy information including at least one type of object identification information.

The determining module may be configured to determine at least one UE according to the at least one type of object identification information.

In one example, in a case where the server is a separate network element, the obtaining module may obtain the notification information through the interface between the obtaining module and the server. Alternatively, in a case where the server is a separate network element, the obtaining module may obtain notification information through the interface located within the obtaining module.

Exemplarily, the notification information carries prediction location information, or optimization operation information.

The prediction location information is prediction location information of the at least one UE at the first time point or the first time period determined by the server according to the measurement report message, and the optimization operation information is information generated by the server according to the prediction location information, and the optimization operation information includes at least one operation indication and a parameter corresponding to at least one operation.

In one example, the executing module may be configured to perform the optimization operation according to the optimization operation information carried in the notification information.

Or, the determining module determines the corresponding optimization operation according to the prediction location information carried in the notification information, and the executing module performs the corresponding optimization operation.

The location prediction apparatus provided in this embodiment is used to implement the location prediction method shown in FIG. 2 and FIG. 3, and the implementation principle and technical effect are similar, and details are not repeated here.

Figure 6:
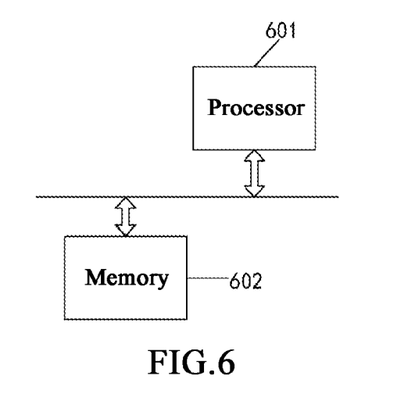
FIG. 6 is a structural diagram of a node according to an embodiment of the present disclosure.

FIG. 6 is a structural diagram of a node according to embodiments of the present application. As shown in FIG. 6, the node includes a processor 601 and a memory 602. One or more processors 601 may be provided in the node and one processor 601 is taken as an example in FIG. 6. The processor 601 and the memory 602 in the node may be connected by a bus or in other ways, and the connection by a bus is taken as an example in FIG. 6.

As a computer-readable storage medium, the memory 602 can be used to store software programs, computer-executable programs, and modules, such as program instructions/modules corresponding to the location prediction method in embodiments of FIG. 1, FIG. 2, and FIG. 3, (for example, the sending module 501, the obtaining module 502, and the executing module 503 in the location prediction apparatus). The processor 601 implements the above-mentioned location prediction method by running software programs, instructions and modules stored in the memory 602.

The memory 602 may mainly include a storage program area and a storage data area. The storage program area may store an operating system, an application program required for at least one function. The storage data area may store data created according to the use of the set-top box, and the like. Additionally, memory 602 may include a high-speed random access memory, and may also include a non-volatile memory, such as at least one magnetic disk storage device, a flash memory device, or other non-volatile solid state storage devices.

Embodiments of the present application further provide a readable and writable storage medium for computer storage, where the storage medium stores one or more programs, and the one or more programs can be executed by one or more processors to perform the location prediction method in the above examples.

Those having ordinary skill in the art can understand that all or part of steps in the methods disclosed above, and functional modules/units in a communication node can be implemented as software, firmware, hardware, and appropriate combinations thereof.

In a hardware implementation, the division of functional modules/units mentioned in the above description does not necessarily correspond to the division of physical components. For example, one physical component may have multiple functions, or one function or step may be executed by several physical components in a cooperative manner. Part of or all physical components may be implemented as software executed by a processor, such as a central processing unit, a digital signal processor or a microprocessor, or as a hardware, or as an integrated circuit, such as an application specific integrated circuit. Such software may be distributed on computer-readable media, which may include computer storage media (or non-transitory media) and communication media (or transitory media). As is known to those having ordinary skill in the art, the term "computer storage media" includes both volatile and nonvolatile, and removable and non-removable media implemented in any method or technology for storage of information (such as computer readable instructions, data structures, program modules or other data flexible). Computer storage media includes, but is not limited to, RAM, ROM, EEPROM, flash memory or other memory technology, CD-ROM, digital versatile disk (DVD) or other optical disk storage, magnetic cartridges, magnetic tape, magnetic disk storage or other magnetic storage devices, or any other medium which is used to store desired information and can be accessed by a computer. In addition, those having ordinary skill in the art know that communication media typically includes computer readable instructions, data structures, program modules, or other data in a modulated data signal such as a carrier wave or other transport mechanism, and may include any information delivery media.

The above only describes the exemplary embodiments of the present application with reference to the accompanying drawings, and is not intended to limit the scope of the present application. Any modifications, equivalent substitutions and improvements made by those skilled in the art without departing from the scope and spirit of the present application shall fall within the scope of the present application.

We claim:

1. A location prediction method, comprising:
   a server obtaining a measurement report message sent by a base station, wherein, the measurement report message comprises at least one of historical location measurement information reported by at least one user equipment (UE) or historical location measurement information of the at least one UE measured by the base station;
   the server determining prediction location information of the at least one UE at a first time point or a first time period, according to the measurement report message; and
   the server sending notification information to the base station, according to the prediction location information;
   wherein the historical location measurement information reported by the at least one UE comprises at least one of speed information or Angle-of-Departure (AOD) measurement information; and
   the historical location measurement information of the at least one UE measured by the base station comprises Angle of Arrival (AOA) measurement information;
   wherein the historical location measurement information reported by the at least one UE further comprises at least one of the following:
   a UE identity, at least one historical time point, or location information of the at least one historical time point, wherein the UE identity corresponds to at least one of the following: the at least one historical time point, the location information, the speed information or the AOD measurement information; and
   the historical location measurement information of the at least one UE measured by the base station further comprises at least one of the following:
   a UE identity or at least one historical time point, wherein the UE identity corresponds to the at least one historical time point or the AOA measurement information.

2. The method according to claim 1, wherein the server obtaining the measurement report message sent by the base station comprises:
   in response to the server being a separate network element, the server obtaining the measurement report message sent by the base station through an interface between the server and the base station; or
   in response to the server being a network element located within the base station, the server obtaining the measurement report message sent by the base station through an interface located within the base station.

3. The method according to claim 1, wherein the notification information carries the prediction location information, or optimization operation information.

4. The method according to claim 3, in response to the notification information carrying the optimization operation information, before the server sending the notification information to the base station according to the prediction location information, the method further comprising:
   the server generating the optimization operation information according to the prediction location information.

5. The method according to claim 4, wherein the optimization operation information comprises at least one operation indication and a parameter corresponding to at least one operation.

6. The method according to claim 3, wherein the server sending the notification information to the base station according to the prediction location information comprises:
   in response to the server being a separate network element, the server sending the notification information to the base station through an interface between the server and the base station; or
   in response to the server being a network element located within the base station, the server sending the notification information to a control plane of the base station through an interface located within the base station.

7. A node, comprising: a memory, at least one processor, a program stored on the memory and executable on the at least one processor, and a data bus for implementing connection and communication between the at least one processor and the memory, wherein the program, when executed by the at least one processor, performs the location prediction method according to claim 1.

8. A non-transitory readable and writable storage medium for computer storage, wherein the storage medium stores one or more programs, and the one or more programs are executable by one or more processors to perform the location prediction method according to claim 1.

9. A location prediction method, comprising:
   a base station sending a measurement report message to a server, wherein the measurement report message comprises at least one of historical location measurement information reported by at least one user equipment (UE) or historical location measurement information of the at least one UE measured by the base station;
   the base station obtaining notification information sent by the server according to the measurement report message; and
   the base station performing an optimization operation according to the notification information;
   wherein the historical location measurement information reported by the at least one UE comprises at least one of speed information or Angle-of-Departure (AOD) measurement information; and
   the historical location measurement information of the at least one UE measured by the base station comprises Angle of Arrival (AOA) measurement information;
   wherein the historical location measurement information reported by the at least one UE further comprises at least one of the following:
   an UE identity, at least one historical time point, or location information of the at least one historical time point, wherein the UE identity corresponds to at least one of the following: the at least one historical time point, the location information, the speed information or the AOD measurement information; and
   the historical location measurement information of the at least one UE measured by the base station further comprises at least one of the following:
   an UE identity or at least one historical time point, wherein the UE identity corresponds to the at least one historical time point and the AOA measurement information.

10. The method according to claim 9, wherein the server sending the measurement report message to the server comprises:
   in response to the server being a separate network element, the base station sending the measurement report message through an interface between the base station and a server; or
   in response to the server being a network element located within the base station, the base station sending the measurement report message to the server through an interface located within the base station.

11. The method according to claim 10, before the base station sends the measurement report message to the server, the method further comprising:
   the base station sending historical location measurement control information to determined at least one UE; and
   the base station receiving the historical location measurement information reported by the at least one UE according to the historical location measurement control information.

12. The method according to claim 10, further comprising: the base station determines the at least one UE in the following manner:
   the base station receiving an activation message sent by a core network, wherein the activation message carries first indication information, the first indication information is used to indicate policy information, and the policy information comprises at least one type of object identification information; and
   the base station determining the at least one UE according to the at least one type of object identification information.

13. The method according to claim 9, wherein the base station obtaining the notification information sent by the server according to the measurement report message comprises:
   in response to the server being a separate network element, the base station obtaining the notification information through an interface between the base station and the server; or
   in response to the server being a network element located within the base station, the base station obtaining the notification information through an interface located within the base station.

14. The method according to claim 9, wherein the notification information carries prediction location information, or optimization operation information;
   wherein, the prediction location information is prediction location information of the at least one UE at a first time point or a first time period determined by the server according to the measurement report message; and
   the optimization operation information is generated by the server according to the prediction location information, and the optimization operation information comprises at least one operation indication and a parameter corresponding to at least one operation.

15. The method according to claim 14, wherein the base station performing the optimization operation according to the notification information comprises:
   the base station performing the optimization operation according to the optimization operation information carried in the notification information; or
   the base station determining and performing a corresponding optimization operation according to the prediction location information carried in the notification information.

16. A node, comprising: a memory, at least one processor, a program stored on the memory and executable on the at least one processor, and a data bus for implementing connection and communication between the at least one processor and the memory, wherein the program, when executed by the at least one processor, performs the location prediction method according to claim 9.

17. A non-transitory readable and writable storage medium for computer storage, wherein the storage medium stores one or more programs, and the one or more programs are executable by one or more processors to perform the location prediction method according to claim 9.

\* \* \* \* \*